US010171407B2

United States Patent
Greenberger et al.

(10) Patent No.: US 10,171,407 B2
(45) Date of Patent: Jan. 1, 2019

(54) COGNITIVE ADJUSTMENT OF SOCIAL INTERACTIONS TO EDITED CONTENT

(71) Applicant: International Business Machines Corporation, Armonk, NY (US)

(72) Inventors: Jeremy A. Greenberger, Raleigh, NC (US); Trudy L. Hewitt, Cary, NC (US); Jana H. Jenkins, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 15/234,127

(22) Filed: Aug. 11, 2016

(65) Prior Publication Data

US 2018/0048614 A1    Feb. 15, 2018

(51) Int. Cl.
*H04L 12/58* (2006.01)
*H04L 29/08* (2006.01)

(52) U.S. Cl.
CPC .............. *H04L 51/32* (2013.01); *H04L 67/02* (2013.01); *H04L 67/22* (2013.01); *H04L 67/306* (2013.01)

(58) Field of Classification Search
CPC ........ H04L 51/32; H04L 67/02; H04L 67/306
See application file for complete search history.

(56) References Cited

U.S. PATENT DOCUMENTS

| | | | | |
|---|---|---|---|---|
| 8,166,032 B2 * | 4/2012 | Sommer | ................. | G06Q 30/02 707/736 |
| 8,825,515 B1 * | 9/2014 | Hanson | .................. | G06Q 50/01 705/7.32 |
| 9,386,110 B2 * | 7/2016 | Cudak | ..................... | H04L 67/22 |
| 9,418,375 B1 * | 8/2016 | Cunico | ............... | G06F 17/2765 |
| 9,418,389 B2 * | 8/2016 | Chandrasekaran | .... | G06Q 50/01 |
| 9,852,239 B2 * | 12/2017 | Natarajan | ............... | G06Q 30/02 |
| 2013/0103667 A1 | 4/2013 | Minh | | |
| 2014/0019548 A1 | 1/2014 | Rafsky et al. | | |
| 2014/0088944 A1 | 3/2014 | Natarajan et al. | | |
| 2015/0032737 A1 * | 1/2015 | Badenes | ............ | G06Q 30/0631 707/723 |
| 2015/0066950 A1 * | 3/2015 | Tobe | ...................... | G06Q 50/01 707/748 |

(Continued)

OTHER PUBLICATIONS

Biddle; Facebook Now Shows Everyone Every Stupid Comment You Edited, Jul. 13, 2012.

(Continued)

*Primary Examiner* — Uzma Alam
(74) *Attorney, Agent, or Firm* — Garg Law Firm, PLLC; Michael O'Keefe

(57) ABSTRACT

A shift in sentiment is computed, the shift including a difference between an original sentiment value of an original content of a post on social media and an edited sentiment value of an edited content of the post, where the post has an associated reaction value. By applying a function to the shift, an action value is computed, the action value corresponding to a type of action that can be used to manipulate the reaction value. An action corresponding to the type of action is selected. An instruction is sent to a social media server to perform the action relative to the reaction value associated with the post, where the instruction causes the reaction value to be manipulated in response to the shift in sentiment.

20 Claims, 5 Drawing Sheets

(56) References Cited

U.S. PATENT DOCUMENTS

| | | | |
|---|---|---|---|
| 2015/0073774 A1 | 3/2015 | Becker et al. | |
| 2015/0149373 A1* | 5/2015 | Chhaya | G06Q 30/0282 |
| | | | 705/319 |
| 2015/0269628 A1* | 9/2015 | Urtso | G06Q 30/0269 |
| | | | 705/14.66 |
| 2016/0055235 A1 | 2/2016 | Zhang et al. | |
| 2016/0285810 A1* | 9/2016 | Bai | H04L 51/22 |
| 2016/0292583 A1* | 10/2016 | Browning | H04L 12/1831 |
| 2016/0300135 A1* | 10/2016 | Moudy | G06F 17/30412 |
| 2016/0337286 A1* | 11/2016 | Bastide | H04L 51/12 |
| 2017/0109838 A1* | 4/2017 | Byron | G06Q 50/01 |
| 2017/0142044 A1* | 5/2017 | Ball | H04L 51/12 |
| 2017/0169475 A1* | 6/2017 | Korpusik | G06Q 30/0269 |
| 2017/0220578 A1* | 8/2017 | Kazi | G06F 17/30867 |
| 2017/0249389 A1* | 8/2017 | Brovinsky | G06Q 30/02 |
| 2017/0302610 A1* | 10/2017 | Naidu | H04L 51/32 |
| 2018/0011853 A1* | 1/2018 | Bastide | G06F 17/30864 |
| 2018/0032608 A1* | 2/2018 | Wu | G06F 17/30719 |

OTHER PUBLICATIONS

Coldwey; Typo in your Facebook status? Just hit the new "edit" button, Sep. 26, 2013.
Sentiment Analysis, Deeply Moving: Deep Learning for Sentiment Analysis, Aug. 2013.
Vogt; Every Edit You've Ever Made to a Facebook Post Is Visible, Jan. 5, 2014.
Constine; Facebook Lets You Edit Posts After Sharing on Android and Web Now, iOS Soon, Sep. 26, 2013.

\* cited by examiner

COGNITIVE ADJUSTMENT OF SOCIAL INTERACTIONS TO EDITED CONTENT

TECHNICAL FIELD

The present invention relates generally to a method, system, and computer program product for keeping social media interactions relevant to an original social media post. More particularly, the present invention relates to a method, system, and computer program product for cognitive adjustment of social interactions to edited content.

BACKGROUND

Social media comprises any medium, network, channel, or technology for facilitating communication between a large number of individuals and/or entities (users). Some common examples of social media are Facebook® or Twitter®, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

A user's contributions or interactions with the social media can include any type or size of data. For example, a user can post text, pictures, videos, links, or combinations of these and other forms of information to a social media website. Furthermore, such information can be posted in any order, at any time, for any reason, and with or without any context. Thus, a user's interactions with a social media can be regarded as unstructured data.

For example, one user—a posting user—posts some content on social media. Another user—a reacting user—reacts or interacts with that post of the posting user. For example, the reacting user may indicate a liking or dislike of the post, may comment on the post, may share that post with others, and perform other such interactions.

Hereinafter, a user who posts content on social media is referred to as a posting user. Content posted by a posting user is referred to as original content. Original content can be edited or changed by the posting user. A changed form of an original content of a post is referred to as edited content. A reacting user is a user different from the posting user, and reacts to or interacts with a post of a posting user. A reaction or interaction of a reacting user with a post of a posting user is collectively and interchangeably referred to as a reaction.

A reaction of a reacting user is a suitable manifestation of an agreement or disagreement with the content of the post. For example, while liking or disliking a post is a manifestation of an agreement or disagreement, respectively, of the reacting user with the post, simply viewing or playing the content of the post is not a manifestation of an agreement or disagreement. Similarly, commenting on a post is a manifestation of an agreement or disagreement depending upon the sentiment of the comment. Sharing a post is also a manifestation of an agreement or disagreement depending upon the sentiment of the commentary contributed by the reacting user with the shared post.

The content of posts, some reactions, or a combination thereof can be expressed in a natural language. Natural language is written or spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a social media post or human speech, and produce structured data—such as an outline of the input content, most significant and least significant parts, a subject, a reference, dependencies within the content, and the like, from the given content.

Shallow parsing is a term used to describe lexical parsing of a given content using NLP. For example, given a sentence, an NLP engine determining what the sentence semantically means (context) according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

A sentiment of a given content can be determined using NLP. For example, by performing NLP on the content of a post, it can be determined whether the content expresses a favorable or unfavorable sentiment about a subject. As an example, "I like strawberries" post can be parsed using NLP to determine that the post has a favorable sentiment towards strawberries, whereas "I hate strawberries" post can be parsed using NLP to determine that the post has an unfavorable sentiment towards strawberries.

SUMMARY

The illustrative embodiments provide a method, system, and computer program product. An embodiment includes a method that computes, a shift in sentiment, the shift comprising a difference between an original sentiment value of an original content of a post on social media and an edited sentiment value of an edited content of the post, wherein the post has an associated reaction value. The embodiment computes, by applying a function to the shift, an action value, the action value corresponding to a type of action that can be used to manipulate the reaction value. The embodiment selects an action corresponding to the type of action. The embodiment sends to a social media server an instruction to perform the action relative to the reaction value associated with the post, wherein the instruction causes the reaction value to be manipulated responsive to the shift in sentiment.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
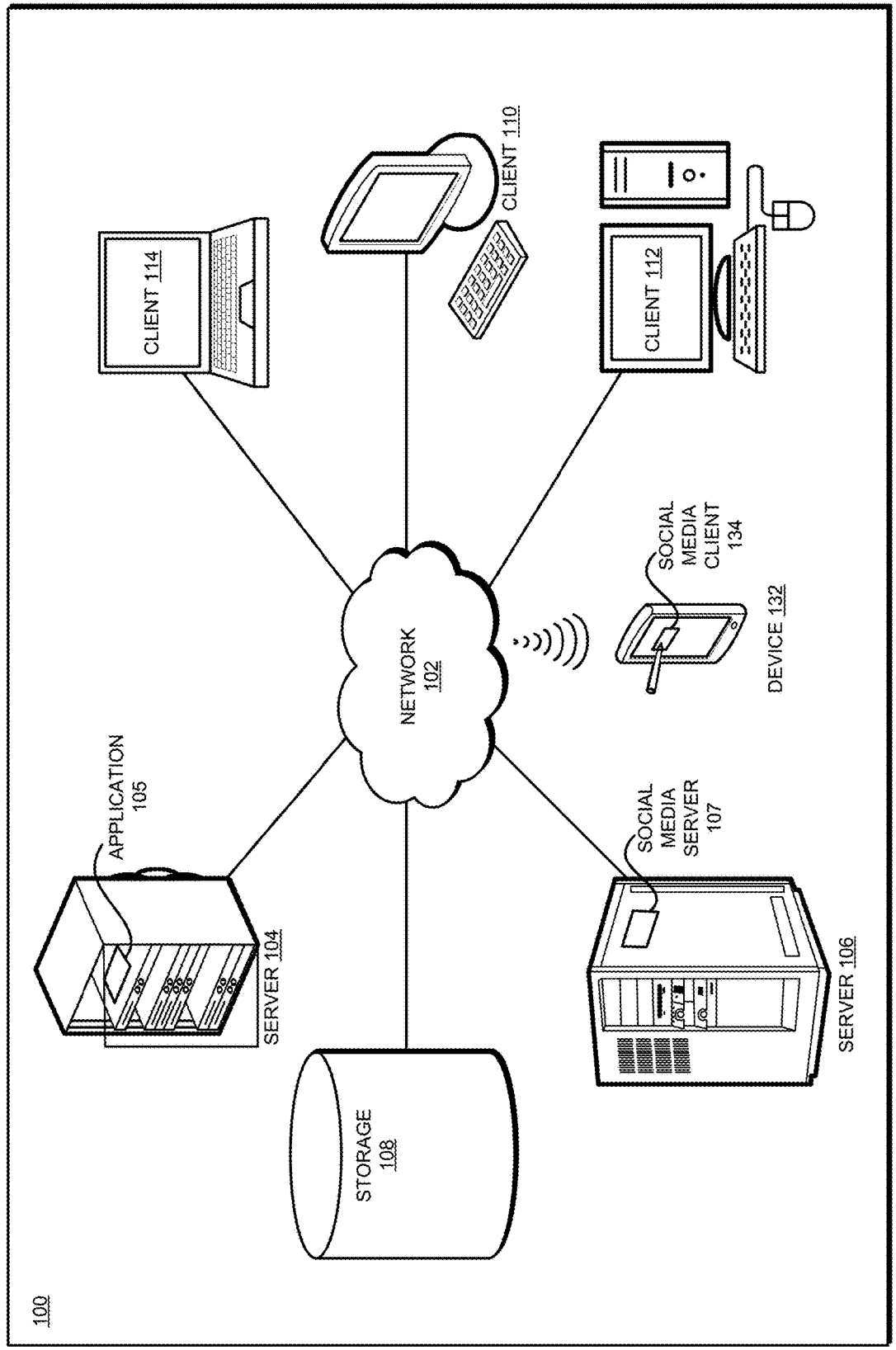
FIG. 1 depicts a block diagram of a network of data processing systems in which illustrative embodiments may be implemented.

Many social media services allow a posting user to edit the original content of a post. The illustrative embodiments recognize that the ability to edit the original content afford a posting user the opportunity to post one original content, receive reactions to the original content, and then edit the original content such that the reactions remain applied to the edited content.

Thus, unscrupulous posting users can exploit the editing function of a social media service to deceptively collect reactions to a benign original content of a post, and then change the post to include undesirable edited content. Even when a posting user does not have a malicious intent behind editing a post, it is possible that a reacting user's reaction to the original content of the post is not similarly applicable to the edited content.

The illustrative embodiments recognize that presently, a reacting user has to manually revisit the post, reevaluate the edited content, re-decide whether the reaction should stand with the edited content, and manually change the reaction if the reaction provided to the original content no longer agrees with the reacting user's opinion of the edited content. Such an onerous requirement on the reacting user is contrary to the spirit of social media.

The illustrative embodiments recognize that a reacting user should not have to manually keep a watch on every reaction they have contributed to the social media—especially when the number of reactions can quickly climb into the thousands over just a few days for prolific social media users. Furthermore, posting users should not be able to collect reactions to one sentiment of a post, and then change the sentiment of the post by editing the content of the post. The illustrative embodiments recognize that a social media platform should be able to automatically maintain and adjust the relevance of the reactions to the dynamically changing content of posts.

The illustrative embodiments used to describe the invention generally address and solve the above-described problems and other problems related to maintaining relevance of reactions to the changing contents of posts.

An embodiment can be implemented as a software application. The application implementing an embodiment can be configured as a modification of an existing social media server, as a separate application that operates in conjunction with an existing social media server, a standalone application, or some combination thereof.

An embodiment detects that an original content of a post, with which a reaction is associated, has been changed to an edited content. The embodiment analyzes a sentiment of the original content (original sentiment) and assigns a value to the original sentiment (original sentiment value). For example, a suitable scale can be used in which the lowest value is indicative of the most unfavorable sentiment and the highest value is indicative of the most favorable sentiment. An analyzed sentiment may correspond to any value of the scale depending upon the degree of favorability that the analysis reveals in the sentiment.

Similarly, the embodiment analyzes a sentiment of the edited content (edited sentiment) and assigns a value to the edited sentiment (edited sentiment value). The embodiment computes a sentiment shift using the original sentiment value and the edited sentiment value. As a non-limiting example, a shift from a lower value to a higher value is a positive shift and may be configured to be indicative of increased favorable sentiment, and vice versa.

Sentiment analysis results in a sentiment value and a confidence value. The confidence value is indicative of the reliability that the NLP engine attributes to the determined sentiment. Similarly, the NLP engine can attribute a degree of confidence in the shift in the sentiment.

The embodiment uses the sentiment shift and the confidence in the sentiment shift in a function to compute an action value. An action value is a value that corresponds to a type of action that should be performed relative to the reaction associated with the original content. For example, resetting a reaction is one type of action that can be performed where a reaction associated with the original content is reset, nullified, or removed. As another example, changing a reaction is another type of action that can be performed where a reaction associated with the original content is changed to a different reaction, including but not limited to reversing the reaction to an opposite reaction.

As another example, notification is another type of action that can be performed. In a notification action, the reacting user is notified about the shift and confidence allowing the user to manipulate the reaction. Although the user would have to manipulate the reaction, the user is provided with significantly more information that is presently available— e.g., the shift and the confidence values resulting from the sentiment analysis of the embodiment—on which the user can base the manipulation, thereby saving significant time and effort over a similar manipulation using the presently available information. Optionally, the notification can also be configured to include a recommended change to the reaction, thereby further reducing the time and effort of the reacting user.

An embodiment can rely on one or more additional factors in determining the action value. An additional factor is another reason that can justify or not justify an action in response to the editing of the content. As an example, one additional factor may be a history of edits to a post where the post has been edited more than a threshold number of times to justify modifying a reaction through one or more types of actions described herein. Another additional factor may be a history of edits to a set of posts by a posting user where the posting user has edited more than a threshold number of posts to justify modifying a reaction through one or more types of actions described herein.

Another additional factor may be a history of reaction manipulations that have already been performed relative to an edited post. For example, if more than a threshold number of reacting users have changed their reactions relative to an edited post, modifying another reaction might be justified through one or more types of actions described herein.

An embodiment can be configured to select an action type according to an action value in a uniform manner across all users of a social media system. For example, if the action value is computed as x, a corresponding action A is selected by the embodiment regardless of the reacting user.

Another embodiment can be configured to select different action types according to an action value in a personalized manner, i.e., differently for different users of a social media system. For example, if the action value is computed as x, the embodiment selects action A according to a configuration of reacting user 1, action B according to a configuration of reacting user 2, and action N according to a configuration of reacting user n.

A method of an embodiment described herein, when implemented to execute on a device or data processing system, comprises substantial advancement of the functionality of that device or data processing system in automatically maintaining the relevance of social media interactions with dynamically changing social media content. For example, presently available methods allow changing a post but leave it to the reacting users to manually revisit the changed content and determine whether their reaction should be adjusted in view of the changed or edited post. An embodiment provides a method for automatically selecting an action to be taken on an interaction or reaction associated with the post when the post changes. An embodiment further automatically performs the action thereby automatically adjusting or changing the reaction. Another embodiment provides additional information to enable the reacting user in the decision-making process to change a reaction. This manner of cognitive adjustment of social interactions to edited content is unavailable in the presently available methods. Thus, a substantial advancement of such devices or data processing systems by executing a method of an embodiment is in cognitively analyzing the changing social media content and automatically adjusting previously provided reactions, in order to maintain the relevance of the reactions to the changed content.

The illustrative embodiments are described with respect to certain types of social media services, posts, contents, reactions, analyses, sentiments, values, shifts, confidence, factors, action types, actions, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
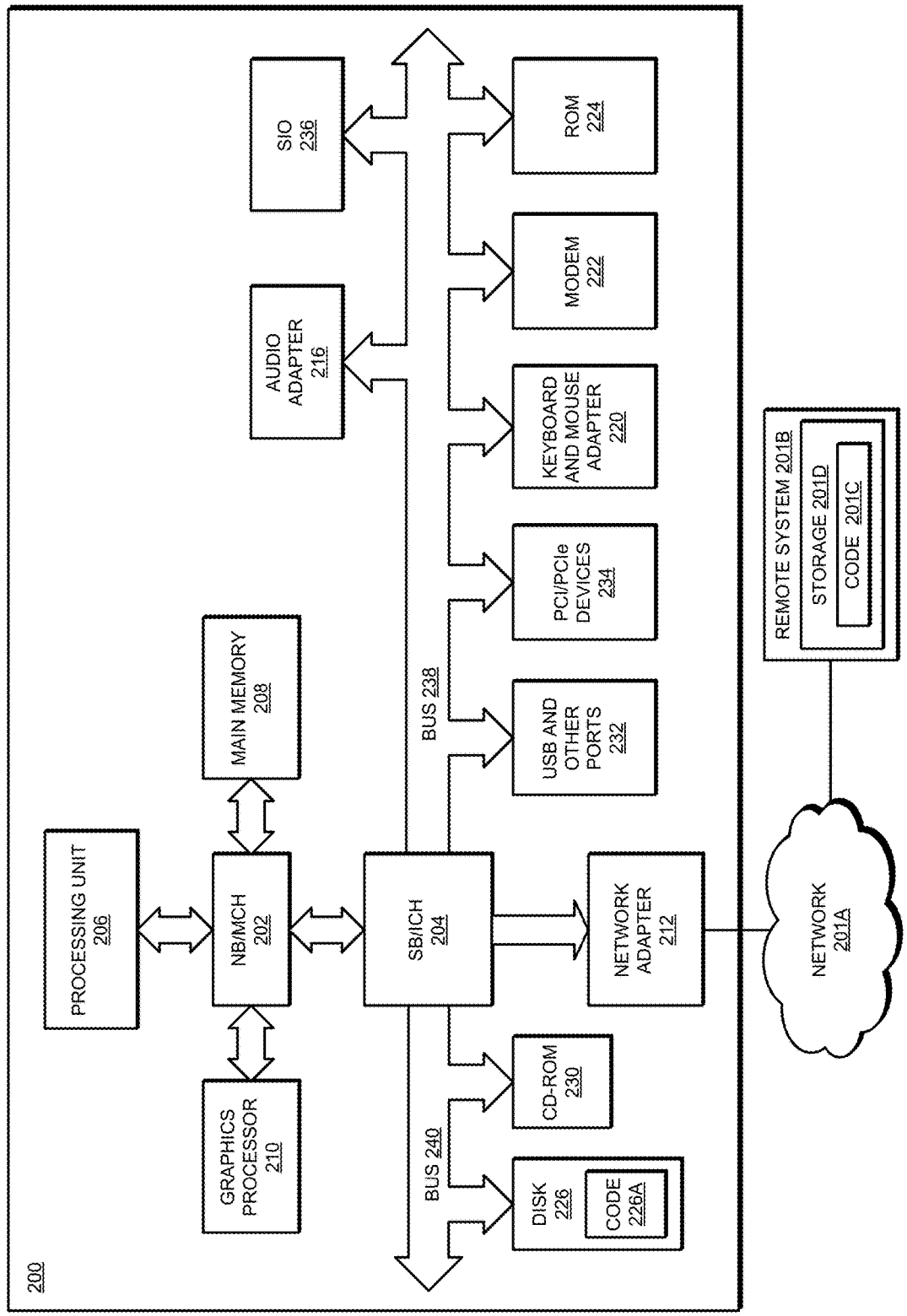
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. A posting user, a reacting user, or both, use social media client applications, such as social media client application 134, to interact with social media server 107. Application 105 receives social media data—e.g., contents of posts, history of changes to one or more posts, history of reaction changes to one or more posts, history of posts and edits of a user, action preference configuration of a user, and the like, from social media server 107. Application 105 computes an action type, and provides one or more instructions to social media server 107 to perform a corresponding action, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
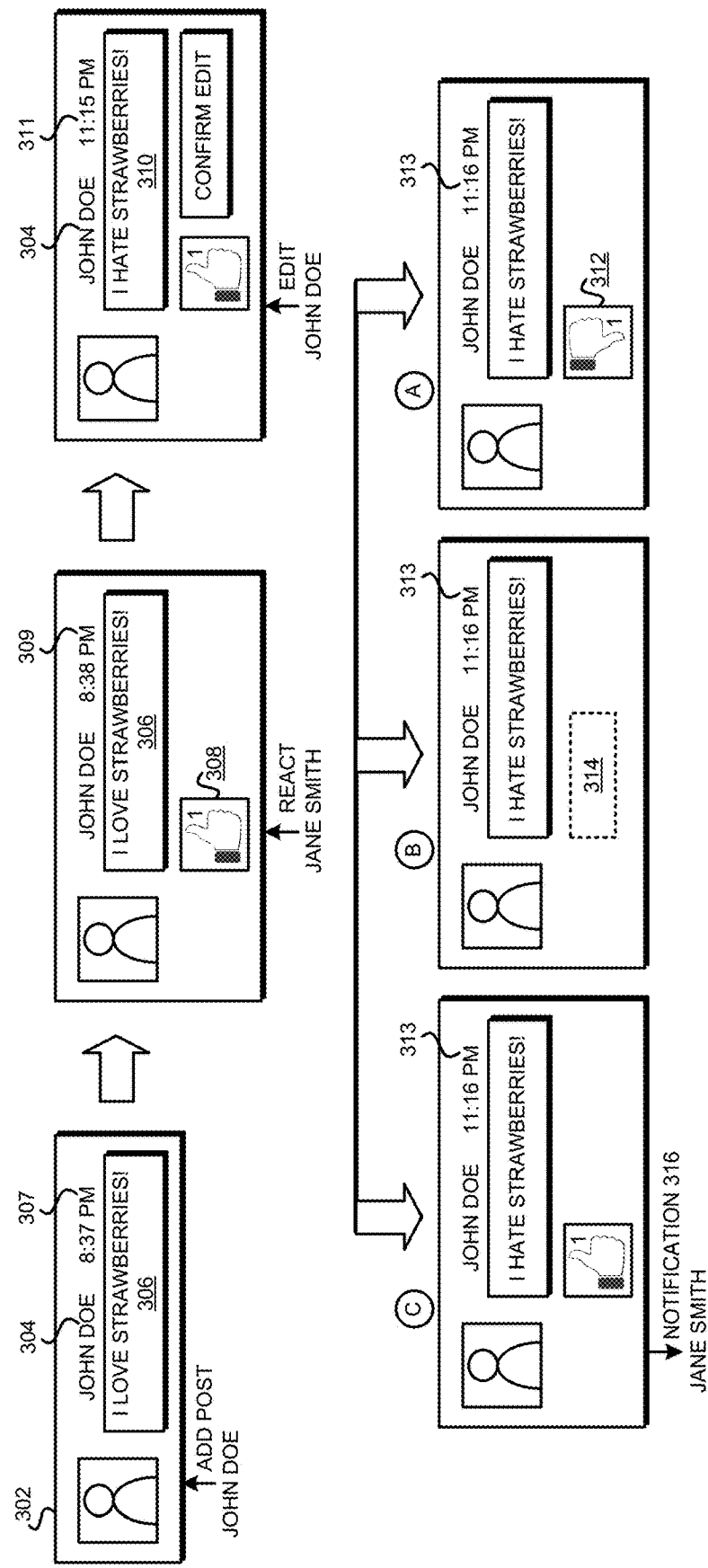
FIG. 3 depicts a block diagram of an example operation for cognitive adjustment of social interactions to edited content in accordance with an illustrative embodiment.

With reference to FIG. 3, this figure depicts a block diagram of an example operation for cognitive adjustment of social interactions to edited content in accordance with an illustrative embodiment. Application 105 in FIG. 1 performs an operation described with respect to FIG. 3.

Social media server 107 in FIG. 1 presents interface 302 where posting user 304 can post original content 306. For example, "John Doe" is an example posting user 304, who adds "I love strawberries" as an example original content 306 in an example post at example time 307.

At example time 309, a reacting user associates reaction 308 with original content 306. At example time 311, posting user 304 changes original content 306 to edited content 310. As an example, John Doe changes original content 306 "I love strawberries" to edited content 310 "I hate strawberries".

The application analyzes the sentiment of original content 306 and the sentiment of edited content 310. The application determines that the sentiment of original content 306 is different from the sentiment of edited content 310. Particularly, in this example, the application determines that the shift from the sentiment of original content 306 to the sentiment of edited content 310 exceeds a threshold with a greater-than-a-threshold degree of confidence, as described herein.

The application computes an action value and selects an action type. FIG. 3 depicts three non-limiting actions of three non-limiting example action types selected based on the action value under different circumstances, as described herein.

For example, in scenario A, at example time 313, the application changes a reaction. Specifically, in the depicted scenario, reaction 308 which was associated with original content 306 due to the sentiment of content 306, is changed to reaction 312 which corresponds with the sentiment of edited content 310. In the depicted example, reaction 312 is the opposite of reaction 308 because the sentiment of edited content 310 is the opposite of the sentiment of original content 306.

As another example, in scenario B, at example time 313, the application changes a reaction. Specifically, in the depicted scenario, reaction 308 which was associated with original content 306 due to the sentiment of content 306, is removed or reset (indicated by empty space 314 at the position of reaction 308).

As another example, in scenario C, at example time 313, the application triggers notification action 316. As described herein, the application provides the shift value, the confidence value, any other factors that contribute to the action, or some combination thereof, in notification 316. The reacting user "Jane Smith" can then decide with the additional information whether to change reaction 308 in response to edited content 310.

Figure 4:
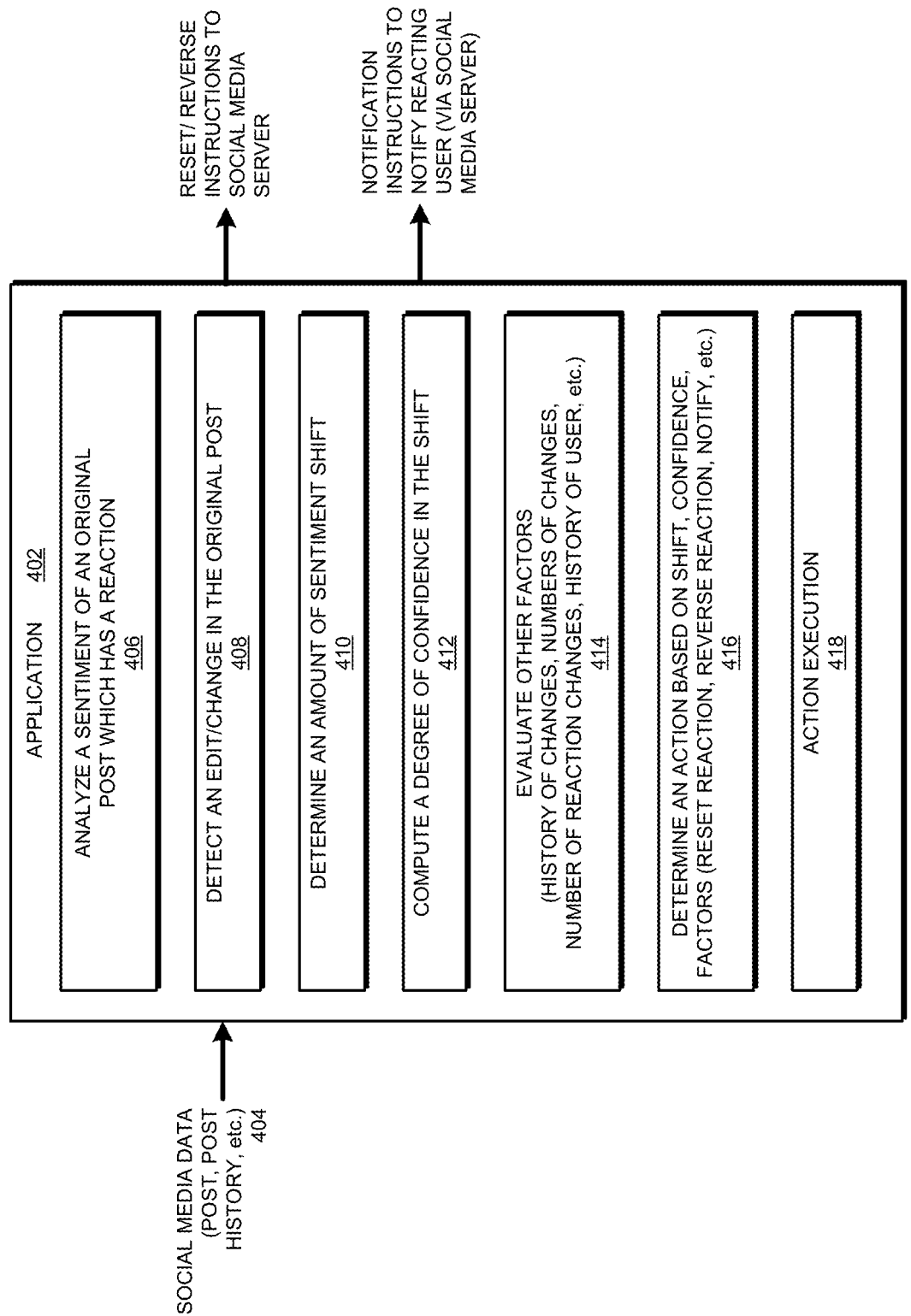
FIG. 4 depicts a block diagram of a configuration for cognitive adjustment of social interactions to edited content in accordance with an illustrative embodiment.

With reference to FIG. 4, this figure depicts a block diagram of a configuration for cognitive adjustment of social interactions to edited content in accordance with an illustrative embodiment. Application 402 is an example of application 105 in FIG. 1.

Social media data 404 is provided by social media server 107 in FIG. 1. Social media data 404 includes a combination of data—e.g., contents of posts, history of changes to one or more posts, history of reaction changes to one or more posts, history of posts and edits of a user, action preference configuration of a user, and the like—as described herein.

Component 406 analyzes a sentiment of an original content of a post with which a reaction is associated. Component 408 detects an edit or a change that is made to the original content. Component 410 computes an amount of sentiment shift between the sentiment of the original content and the sentiment of the edited content. Component 412 computes a degree of confidence that can be attributed to the determined shift, given the NLP applied to the contents.

Component 414 computes an action value using at least the shift value, and optionally the confidence value. Optionally, when one or more additional factors as described herein are available, component 414 evaluates such one or more factors and adjusts the action value according to an implementation-specific function.

Component 416 determines an action to take in response to the edited content. Some non-limiting example types of actions are described herein, such as resetting a reaction, reversing a reaction, and triggering a notification. From this disclosure, those of ordinary skill in the art will be able to conceive many other action types and actions, and the same are contemplated within the scope of the illustrative embodiments.

Component 418 causes a selected action to be used or executed. For example, if a reset action is selected, component 418 outputs one or more instructions to social media server 107, which executes those instructions to reset a reaction that was associated with the original content of the post.

As another example, if a reverse or change action is selected, component 418 outputs one or more instructions to social media server 107 which executes those instructions to reverse or otherwise change a reaction that was associated with the original content of the post. As another example, if a notification action is selected, component 418 outputs one or more instructions and one or more pieces of information as described herein, to social media server 107 which executes those instructions to notify a reacting user to adjust the user's reaction that was associated with the original content of the post.

Figure 5:
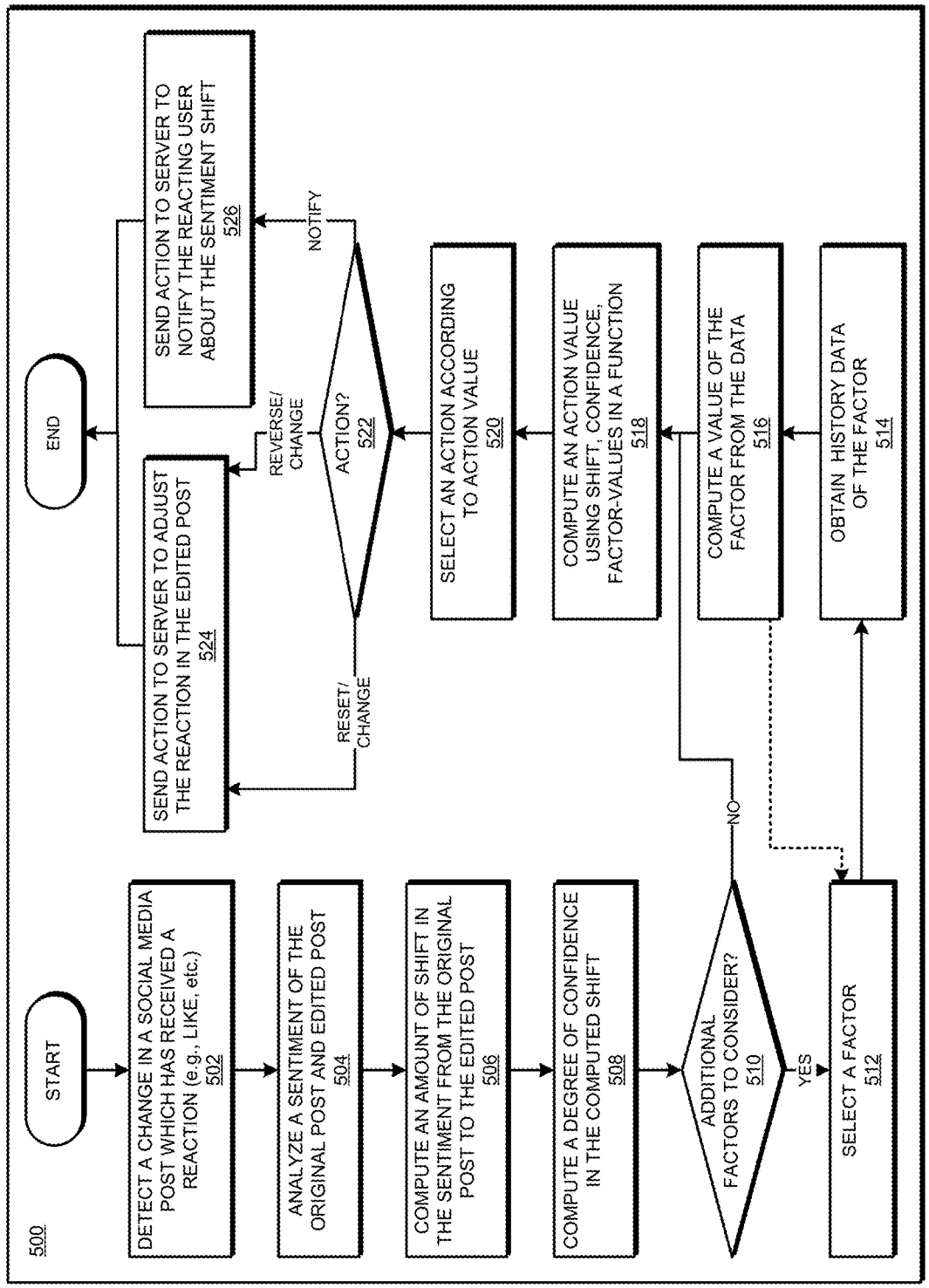
FIG. 5 depicts a flowchart of an example process for cognitive adjustment of social interactions to edited content in accordance with an illustrative embodiment.

With reference to FIG. 5, this figure depicts a flowchart of an example process for cognitive adjustment of social interactions to edited content in accordance with an illustrative embodiment. Process 500 can be implemented in application 402 in FIG. 4.

The application detects a chance in a social media post which has received a reaction block 502). The application analyzes a sentiment of the original content and the edited content (block 504).

The application computes a shift value indicative of an amount of shift in the sentiment from the original content to the edited content (block 506). Optionally, the application also computes a degree of confidence in the computed shift in sentiment (block 508).

The application determines whether one or more additional factors is to be considered (block 510). If one or more additional factor are to be considered ("Yes" path of block 510), the application selects a factor (block 512). The application obtains the data of the selected factor (block 514). The application computes a value corresponding to the factor from the data (block 516). The application repeats blocks 512-516 as many times as the number of factors that are to be considered. The application then proceeds to block 518. If no additional factor is to be considered ("No" path of block 510), the application proceeds to block 518 as well.

The application computes an action value using at least the shift value, and optionally the confidence value and one or more factor values—if computed, (block 518). The application selects an action corresponding to the action value (block 520).

If the selected action is to change—such as including but not limited to resetting or reversing a reaction ("Reset" and "reverse" paths of block 522), the application sends the action, i.e., instructions for the action, to the social media server (block 524). The social media server adjusts the reaction according to the instructions. The application ends process 500 thereafter.

If the selected action is to notify a reacting user ("Notify" paths of block 522), the application sends the action, i.e., instructions for the notification action, to the social media server (block 526). The social media server notifies the reacting user with the additional information as described herein. The application ends process 500 thereafter.

Thus, a computer implemented method, system or apparatus, and computer program product are provided in the illustrative embodiments for cognitive adjustment of social interactions to edited content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    computing, a shift in sentiment using a natural language processing engine of a data processing system, the shift comprising a difference between an original sentiment value of an original content of a post on social media and an edited sentiment value of an edited content of the post, wherein the post has an associated reaction value;
    computing, by applying a function to the shift, an action value, the action value corresponding to a type of action that can be used to manipulate the reaction value;

selecting an action corresponding to the type of action, wherein the type of action is a change type, wherein the action corresponding to the change type is at least one of a reset action and a reverse action, wherein the reset action resets the reaction value to a null value, and wherein the reverse action changes the reaction value to an opposite value; and sending, to a social media server, an instruction to perform the action relative to the reaction value associated with the post, wherein the instruction causes the reaction value to be manipulated responsive to the shift in sentiment.

2. The method of claim 1, further comprising:
determining, using historical data about the post, a number of edits performed on the post;
computing, responsive to the number of edits exceeding a threshold number, a factor value corresponding to the number of edits; and
using the factor value in the function to compute the action value.

3. The method of claim 1, further comprising:
determining, using historical data about the post, a number of edits performed on a set of posts by the author of the post;
computing, responsive to the number of edits exceeding a threshold number, a factor value corresponding to the number of edits; and
using the factor value in the function to compute the action value.

4. The method of claim 1, further comprising:
determining, using historical data about the post, a number of reaction values that have been changed relative to the post;
computing, responsive to the number of reaction values that have been changed exceeding a threshold number, a factor value corresponding to the number of reaction values that have been changed; and
using the factor value in the function to compute the action value.

5. The method of claim 1, further comprising:
computing a confidence value corresponding to the shift in sentiment, wherein the confidence value corresponds to a confidence level associated with a sentiment analysis of the edited content.

6. The method of claim 5, further comprising:
using the confidence value in the function to compute the action value.

7. The method of claim 1, wherein the action corresponding to the change type is the reset action.

8. The method of claim 1, wherein the action corresponding to the change type is the reverse action.

9. The method of claim 1, wherein the type of action is a notification type, wherein the action corresponding to the notification type is a notification action, further comprising:
sending information about the shift in sentiment to a user who supplied the reaction value.

10. The method of claim 1, further comprising:
parsing, using Natural Language Processing (NLP), the original content to determine an original sentiment;
computing a first value corresponding to the original sentiment, the first value forming the original sentiment value;
parsing, using NLP, the edited content to determine an edited sentiment; and
computing a second value corresponding to the edited sentiment, the second value forming the edited sentiment value.

11. A computer usable program product comprising one or more computer-readable storage devices, and program instructions stored on at least one of the one or more storage devices, the stored program instructions comprising:
program instructions to compute, a shift in sentiment using a natural language processing engine of a data processing system, the shift comprising a difference between an original sentiment value of an original content of a post on social media and an edited sentiment value of an edited content of the post, wherein the post has an associated reaction value;
program instructions to compute, by applying a function to the shift, an action value, the action value corresponding to a type of action that can be used to manipulate the reaction value;
program instructions to select an action corresponding to the type of action, wherein the type of action is a change type, wherein the action corresponding to the change type is at least one of a reset action and a reverse action, wherein the reset action resets the reaction value to a null value, and wherein the reverse action changes the reaction value to an opposite value; and
program instructions to send, to a social media server, an instruction to perform the action relative to the reaction value associated with the post, wherein the instruction causes the reaction value to be manipulated responsive to the shift in sentiment.

12. The computer usable program product of claim 11, further comprising:
program instructions to determine, using historical data about the post, a number of edits performed on the post;
program instructions to compute, responsive to the number of edits exceeding a threshold number, a factor value corresponding to the number of edits; and
program instructions to use the factor value in the function to compute the action value.

13. The computer usable program product of claim 11, further comprising:
program instructions to determine, using historical data about the post, a number of edits performed on a set of posts by the author of the post;
program instructions to compute, responsive to the number of edits exceeding a threshold number, a factor value corresponding to the number of edits; and
program instructions to use the factor value in the function to compute the action value.

14. The computer usable program product of claim 11, further comprising:
program instructions to determine, using historical data about the post, a number of reaction values that have been changed relative to the post;
program instructions to compute, responsive to the number of reaction values that have been changed exceeding a threshold number, a factor value corresponding to the number of reaction values that have been changed; and
program instructions to use the factor value in the function to compute the action value.

15. The computer usable program product of claim 11, further comprising:
program instructions to compute a confidence value corresponding to the shift in sentiment, wherein the confidence value corresponds to a confidence level associated with a sentiment analysis of the edited content.

16. The computer usable program product of claim 15, further comprising:

program instructions to use the confidence value in the function to compute the action value.

17. The computer usable program product of claim 11, wherein the action corresponding to the change type is the reset action.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to compute, a shift in sentiment using a natural language processing engine of a data processing system, the shift comprising a difference between an original sentiment value of an original content of a post on social media and an edited sentiment value of an edited content of the post, wherein the post has an associated reaction value;

program instructions to compute, by applying a function to the shift, an action value, the action value corresponding to a type of action that can be used to manipulate the reaction value;

program instructions to select an action corresponding to the type of action, wherein the type of action is a change type, wherein the action corresponding to the change type is at least one of a reset action and a reverse action, wherein the reset action resets the reaction value to a null value, and wherein the reverse action changes the reaction value to an opposite value; and program instructions to send, to a social media server, an instruction to perform the action relative to the reaction value associated with the post, wherein the instruction causes the reaction value to be manipulated responsive to the shift in sentiment.

* * * * *